United States Patent Office 3,004,024
Patented Oct. 10, 1961

3,004,024
BENZOTHIADIAZINE DERIVATIVES
Jack Bernstein and Harry Louis Yale, New Brunswick, N.J., assignors to Olin Mathieson Chemical Corporation, New York, N.Y., a corporation of Virginia
No Drawing. Filed Apr. 10, 1959, Ser. No. 805,374
10 Claims. (Cl. 260—243)

This invention relates to new dihydrobenzothiadiazine derivatives, and more particularly to new trifluoromethyl-dihydrobenzothiadiazinesulfonamide derivatives of the general formula

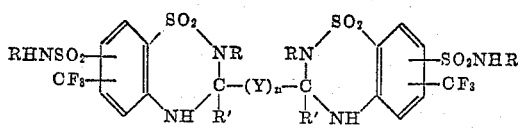

as well as the alkali metal salts thereof, wherein the R's are the same or different and represent hydrogen, lower alkyl or aryl or less than twelve carbon atoms, the R' are the same or different and represent hydrogen, lower alkyl, phenyl or benzyl, Y is lower alkylene or phenylene, and n is zero or one. [By "aryl" is meant hydrocarbon aromatic radicals of less than twelve carbon atoms, such as phenyl, tolyl, xylyl and naphthyl, as well as simply substituted derivatives thereof, such as halo derivatives (e.g. the chlorphenyls and bromphenyls), nitro derivatives (e.g. 4-nitrophenyl), amino derivatives (e.g. 4-aminophenyl), sulfamyl derivatives, and lower alkoxy derivatives (e.g. anisyl and the dimethoxy derivatives of phenyl).]

The new dihydrobenzothiadiazines of this invention are physiologically active compounds which possess both diuretic and anti-hypertensive activities. Thus, these compounds are administrable parenterally and (preferably) orally in the treatment of congestive heart failure, being uniquely suitable for the treatment of this and other conditions where both the diuretic and anti-hypertensive activities are desirable.

The compounds of this invention are prepared by the process of this invention which essentially comprises heating a compound of the general formula

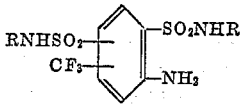

wherein R is as hereinbefore defined, with a compound of the formula:

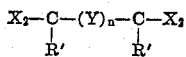

wherein R', Y and n are as hereinbefore defined, and X is halo (e.g. bromo and chloro) or lower alkoxy (e.g. methoxy and ethoxy) or together the X's are keto (oxo). The reaction is preferably conducted employing not more than one mole of the carbonyl compound for every two moles of the disulfonamide.

Suitable carbonyl reactants include the lower alkanedials, such as glyoxal, succinaldehyde, glutaraldehyde and adipaldehyde; lower ketoalkanals, such as pyruvic aldehyde; lower alkanediones, such as diacetyl and acetylacetone; benzoyl-lower alkanals, such as phenyl glyoxal and β-benzoylpropionaldehyde; phenacetyl-lower alkanals such as β-phenacetylpropionaldehyde; dibenzoyl-lower alkanes, such as dibenzoylmethane and 1,2-dibenzoylethane; diphenacetyl-lower alkanes, such as 1,5-diphenyl-2,4-pentanedione and 1,6-diphenyl-2,5-hexanedione; phthalic aldehydes, such as terephthalic aldehyde; and phenylene-di-lower alkanones, such as 1,3-diacetylbenzene and 1,4-diacetylbenzene; the tetra-(lower alkyl) acetal and ketal derivatives thereof, such as 1,1,3,3-tetramethoxypropane, 1,1,4,4-tetraethoxybutane, and 2,2,3,3-tetramethoxybutane; and the tetrahalo derivatives thereof, such as 1,1,3,3-tetrabromopropane.

Suitable disulfonamide reactants can be prepared as disclosed in our applications, Serial No. 698,377, filed November 25, 1957, Serial No. 794,247, filed February 19, 1959, and Serial No. 794,262, filed February 19, 1959, and specifically include 5-amino-α,α,α-trifluoro-2,4-toluenedisulfonamide, 4-amino-α,α,α-trifluoro-3,5-toluenedisulfonamide, 2-amino-α,α,α-trifluoro-3,5-toluenedisulfonamide; the mono- and di-lower alkyl derivatives thereof (i.e. those compounds wherein one or both R's are lower alkyl), such as the mono- and di-methyl, ethyl, and propyl derivatives thereof; the mono- and di-aryl derivatives thereof (i.e. those compounds wherein one or both R's are aryl radicals of less than twelve carbon atoms), such as the mono- and di-phenyl, p-chlorophenyl, m-tolyl, and p-methoxyphenyl derivatives thereof; and the lower alkyl, aryl derivatives thereof (i.e. those compounds wherein one R is lower alkyl and the other R is an aryl radical of less than twelve carbon atoms).

When an aldehyde, ketone, acetal or ketal is employed as the reactant the process is preferably carried out in the presence of an acid catalyst, such as dilute aqueous hydrochloric, phosphoric, p-toluenesulfonic, trichloroacetic or sulfuric acid. If a tetrahalo derivative is used, the reaction is preferably conducted under basic conditions followed by treatment with an acid. The free dihydrobenzothiadiazine dioxides, thus formed, can then, if desired, be treated with alcoholic alkali metal hydroxides (e.g. potassium hydroxide), whereby the alkali metal salts are formed.

The following examples illustrate the invention (all temperatures being in centigrade):

EXAMPLE 1

*3,3'-ethylenebis-(3,4-dihydro-6-trifluoromethyl-1,2,4-benzothiadiazine-7-sulfonamide 1,1-dioxide)*

A mixture of 31.9 g. (0.1 mole) of 5-amino-α,α,α-trifluoro-2,4-toluenedisulfonamide and 4.3 g. (0.05 mole) of succinaldehyde in 250 ml. of 95% ethanol and 25 ml. of 10% aqueous hydrochloric acid is refluxed for 4 hours. The alcohol is then distilled from the reaction mixture and the residue warmed on a steam bath with 25 ml. of 20% aqueous hydrochloric acid plus 100 ml. of alcohol, the alcohol being allowed to distill slowly from the flask. The residue, which crystallizes, is filtered and washed with ether. The solid, which weighs about 20 g. is recrystallized twice from acetonitrile containing about 10% water. The product thus obtained melts at about 257–259° with decomposition.

EXAMPLE 2

*Tetrapotassium salt of 3,3'-ethylenebis-(3,4-dihydro-6-trifluoromethyl-1,2,4-benzothiadiazine-7-sulfonamide 1,1-dioxide)*

To a solution of 6.6 g. of 85% potassium hydroxide in 100 ml. of ethanol is added gradually with shaking 17.2 g. of 3,3'-ethylenebis-(3,4-dihydro-6-trifluoromethyl-1,2,4-benzothiadiazine-7-sulfonamide 1,1-dioxide). The solid dissolves. The resulting alcoholic solution is concentrated in vacuo to yield the tetrapotassium salt of 3,3'-ethylenebis-(3,4-dihydro-6-trifluoromethyl-1,2,4-benzothiadiazine-7-sulfonamide 1,1-dioxide).

Similarly, using the equivalent quantity of sodium hydroxide instead of potassium hydroxide in the procedure of Example 2, the tetrasodium salt is obtained. Furthermore, if only 3.3 g. of 85% potassium hydroxide is used in Example 2, the dipotassium salt is obtained.

EXAMPLE 3

*3,3'-ethylenebis-(3,4-dihydro-7-trifluoromethyl-1,2,4,-benzothiadiazine-7-sulfonamide 1,1-dioxide)*

Following the procedure of Example 1, but substituting 31.9 g. of 4-amino-α,α,α-trifluoro-3,5-toluenedisulfonamide for the 5-amino-α,α,α-trifluoro-2,4-toluenedisulfonamide, 3,3'-ethylenebis-(3,4-dihydro - 7 - trifluoromethyl-1,2,4-benzothiadiazine-5-sulfonamide 1,1-dioxide) is obtained.

EXAMPLE 4

*3,3'-ethylenebis-(3,4-dihydro-5-trifluoromethyl-1,2,4-benzothiadiazine-7-sulfonamide 1,1-dioxide)*

Following the procedure of Example 1, but substituting 31.9 g. of 2-amino-α,α,α-trifluoro-3,5-toluenedisulfonamide for the 5-amino-α,α,α-trifluoro-2,4-toluenedisulfonamide, 3,3'-ethylenebis-(3,4-dihydro - 5 - trifluoromethyl-1,2,4-benzothiadiazine-7-sulfonamide 1,1-dioxide) is obtained.

EXAMPLE 5

*3,3'-tetramethylenebis-(3,4-dihydro-6-trifluoromethyl-1,2,4-benzothiadiazine-7-sulfonamide 1,1-dioxide)*

Following the procedure of Example 1, but substituting 5.7 g. of adipaldehyde for the succinaldehyde, there is obtained 3,3'-tetramethylene-bis-(3,4-dihydro-6-trifluoromethyl-1,2,4-benzothiadiazine-7-sulfonamide 1,1-dioxide).

EXAMPLE 6

*3,3'-bis-(3,4-dihydro-3-methyl-6-trifluoromethyl-1,2,4-benzothiadiazine-7-sulfonamide 1,1-dioxide)*

Following the procedure of Example 1, but substituting 4.3 g. of diacetyl for the succinaldehyde, there is obtained 3,3'-bis-(3,4-dihydro-3-methyl-6-trifluoromethyl-1,2,4-benzothiadiazine-7-sulfonamide 1,1-dioxide).

Similarly, by substituting an equivalent amount of glyoxal, glutaric aldehyde and pyruvic aldehyde for the succinaldehyde in Example 1, 3,3'-bis-(3,4-dihydro-6-trifluoromethyl-1,2,4-benzothiadiazine-7-sulfonamide 1,1-dioxide), 3,3'-trimethylene-bis-(3,4-dihydro-6-trifluoromethyl-1,2,4-benzothiadiazine-7-sulfonamide 1,1-dioxide), and 3-methyl - 3,3' - bis - (3,4 - dihydro - 6 - trifluoromethyl-1,2,4-benzothiadiazine-7-sulfonamide 1,1-dioxide) are obtained, respectively.

EXAMPLE 7

*3,3' - ethylenebis - (3,4 - dihydro - N,2 - dimethyl - 6 - trifluoromethyl - 1,2,4 - benzothiadiazine - 7 - sulfonamide 1,1-dioxide)*

Following the procedure of Example 1 but substituting 34.7 g. of 5-amino-α,α,α-trifluoro-N,N'-dimethyl-2,4-toluenedisulfonamide for the 5-amino-α,α,α-trifluoro-2,4-toluenedisulfonamide, there is obtained 3,3'-ethylenebis-(3,4 - dihydro - N,2 - dimethyl - 6 - trifluoromethyl - 1,2,4-benzothiadiazine-7-sulfonamide 1,1-dioxide).

Similarly, by substituting an equivalent amount of 2-amino - 4 - trifluoromethyl - 5 - (N - methylsulfamyl)-benzenesulfonamide, 5-amino-α,α,α-trifluoro-N,N'-diethyl-2,4-toluenedisulfonamide and 5-amino-α,α,α-trifluoro-N,N'-di-n-hexyl-2,4-toluenedisulfonamide for the 5-amino-α,α,α-trifluoro-2,4-toluenedisulfonamide in Example 1, 3,3'-ethylenebis-(3,4-dihydro-N-methyl-6-trifluoromethyl-1,2,4-benzothiadiazine-7-sulfonamide 1,1-dioxide), 3,3'-ethylenebis - (3,4 - dihydro - N,2 - diethyl - 6 - trifluoromethyl-1,2,4-benzothiadiazine-7-sulfonamide 1,1-dioxide) and 3,3'-ethylenebis-(3,4-dihydro-N,2-n-hexyl-6-trifluoromethyl-1,2,4-benzothiadiazine-7-sulfonamide 1,1-dioxide) are obtained, respectively.

EXAMPLE 8

*3,3'-ethylenebis-(3,4 - dihydro - N,2 - diphenyl-6-trifluoromethyl-1,2,4-benzothiadiazine-7-sulfonamide 1,1-dioxide)*

Following the procedure of Example 1, but substituting 47.1 g. of 5-amino-α,α,α-trifluoro-N,N'-diphenyl-2,4-toluenedisulfonamide for the 5-amino-α,α,α-trifluoro-2,4-toluenedisulfonamide, there is obtained 3,3'-ethylenebis-(3,4 - dihydro - N,2 - diphenyl - 6 - trifluoromethyl - 1,2,4-benzothiadiazine-7-sulfonamide 1,1-dioxide).

Similarly, by substituting an equivalent amount of 2-amino - 4 - trifluoromethyl - 5 - (N - phenylsulfamyl)-benzenesulfonamide, 5-amino-α,α,α-trifluoro-N,N'-di-4'-chlorophenyl-2,4-toluenedisulfonamide and 5-amino-α,α,α-trifluoro-N,N'-di-4'-methoxyphenyl - 2,4 - toluenedisulfonamide for the 5-amino-α,α,α-trifluoro-2,4-toluenedisulfonamide in Example 1, there is obtained 3,3'-ethylenebis - (3,4 - dihydro - N - phenyl - 6 - trifluoromethyl - 1,2,4-benzothiadiazine-7-sulfonamide 1,1-dioxide), 3,3'-ethylenebis - (3,4 - dihydro - N,N' - di - 4' - chlorophenyl - 6-trifluoromethyl-1,2,4-benzothiadiazine-7-sulfonamide 1,1-dioxide) and 3,3',-ethylenebis - (3,4 - dihydro-N,N'-di-4'-methoxyphenyl - 6 - trifluoromethyl - 1,2,4 - benzothiadiazine 7-sulfonamide 1,1-dioxide), respectively.

EXAMPLE 9

*3,3'-ethylenebis-(3,4-dihydro-6-trifluoromethyl-1,2,4-benzothiadiazine-7-sulfonamide 1,1-dioxide)*

A mixture of 31.9 g. (0.1 mole) of 5-amino-α,α,α-trifluoro-2,4-toluenedisulfonamide and 11.7 g. of 1,1,4,4-tetraethoxybutane in 250 ml. of 80% ethanol and 25 ml. of 20% aqueous hydrochloric acid is refluxed for eight hours. The alcohol is then distilled from the reaction mixture and the crystalline residue is filtered. The crude product, after air-drying, is washed with ether and recrystallized from aqueous acetonitrile to give the desired product, melting at about 256–259°, with decomposition.

EXAMPLE 10

*3,3'-methylenebis-(3,4-dihydro-6-trifluoromethyl-1,2,4-benzothiadiazine-7-sulfonamide 1,1-dioxide)*

Following the procedure of Example 9 but substituting 8.2 g. of 1,1,3,3-tetramethoxypropane for the 1,1,4,4-tetraethoxybutane, 3,3'-methylenebis-(3,4-dihydro-6-trifluoromethyl-1,2,4-benzothiadiazine-7-sulfonamide 1,1-dioxide) is obtained.

EXAMPLE 11

*3,3'-p-phenylene-bis-(3,4-dihydro-6-trifluoromethyl-1,2,4-benzothiadiazine-7-sulfonamide 1,1-dioxide)*

A mixture of 31.9 g. of 5-amino-α,α,α-trifluoro-2,4-toluene-disulfonamide, 6.7 g. of terephthalic aldehyde, 1 g. of p-toluenesulfonic acid and 200 ml. of ethoxyethanol is refluxed for 24 hours, treated with decolorizing carbon and then diluted with 300 ml. of water. The precipitate is filtered, washed with water and recrystallized from acetonitrile to give the desired 3,3'-p-phenylene-bis-(3,4-dihydro-6-trifluoromethyl-1,2,4-benzothiadiazine - 7 - sulfonamide 1,1-dioxide).

EXAMPLE 12

*3,3'-methylenebis-(3,4-dihydro - 6 - trifluoromethyl-1,2,4-benzothiadiazine-7-sulfonamide 1,1-dioxide)*

A mixture of 79.5 g. of 5-amino-α,α,α-trifluoro-2,4-toluenedisulfonamide, 45.0 g. of 1,1,3,3-tetrabromopropane, 39.5 g. of anhydrous potassium carbonate and 250 ml. of dimethylformamide is stirred for one hour at 100°. The mixture is then treated with a solution of 16 g. of 85% potassium hydroxide in 20 ml. of water and heated an additional hour at 100°. The mixture is then concentrated in vacuo from the steam bath and the residue dispersed into 500 ml. of water. The dispersion is then made acidic with dilute aqueous hydrochloric acid, heated on a steam bath for about two hours and cooled to give 3,3'-methylenebis-(3,4-dihydro-6-trifluoromethyl - 1,2,4 - benzothiadiazine-7-sulfonamide 1,1-dioxide).

EXAMPLE 13

*3,3'-methylenebis(3,4-dihydro-3-benzyl-6-trifluoromethyl-1,2,4-benzothiadiazine-7-sulfonamide 1,1-dioxide)*

A mixture of 63.8 grams of 5-amino-α,α,α-trifluoro-2,4-toluenedisulfonamide, 25.2 grams of 1,5-diphenyl-2,4-pentanedione, 1 gram of p-toluenesulfonic acid and 300 ml. of ethoxyethanol is refluxed for 20 hours, treated with decolorizing carbon and the warm filtrate then diluted with 500 ml. of warm water (75°). The mixture is then cooled and the precipitated product is filtered and washed with water. It is then recrystallized from acetonitrile to give the desired 3,3'-methylenebis(3,4-dihydro-3-benzyl-6-trifluoromethyl - 1,2,4 - benzothiadiazine-7-sulfonamide 1,1-dioxide).

EXAMPLE 14

*3,3'-ethylenebis-(3,4-dihydro-3-benzyl-6-trifluoromethyl-1,2,4-benzothiadiazine-7-sulfonamide 1,1-dioxide)*

Following the procedure of Example 13 but substituting 26.6 grams of 1,6-diphenyl-2,5-hexanedione for the 1,5-diphenyl-2,4-pentanedione, there is obtained 3,3'-ethylenebis-(3,4-dihydro-3-benzyl - 6 - trifluoromethyl-1,2,4-benzothiadiazine-7-sulfonamide 1,1-dioxide).

The invention may be variously otherwise embodied within the scope of the appended claims.

What is claimed is:

1. A compound selected from the group consisting of dihydrobenzothiadiazines of the formula

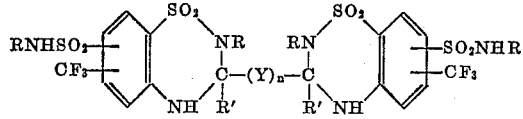

and alkali metal salts thereof, wherein each R is selected from the group consisting of hydrogen, lower alkyl, phenyl, lower alkyl phenyl, chlorphenyl, bromphenyl, nitrophenyl, lower alkoxy phenyl and sulfamylphenyl; each R' is selected from the group consisting of hydrogen, lower alkyl, phenyl and benzyl; Y is selected from the group consisting of lower alkylene and p-phenylene, and $n$ is selected from the group consisting of zero and one.

2. 3,3'-lower alkylene-bis-(3,4-dihydro-trifluoromethyl-1,2,4-benzothiadiazine-sulfonamide 1,1-dioxide).

3. 3,3'-lower alkylene-bis-(3,4-dihydro-6-trifluoromethyl-1,2,4-benzothiadiazine-sulfonamide 1,1-dioxide).

4. 3,3'-ethylenebis-(3,4-dihydro-6-trifluoromethyl - 1,2,4-benzothiadiazine-7-sulfonamide 1,1-dioxide).

5. 3,3'-lower alkylene-bis-[3,4-dihydro - N,2 - di(lower alkyl)-6-trifluoromethyl-1,2,4-benzothiadiazine - 7 - sulfonamide 1,1-dioxide].

6. 3,3'-ethylenebis-(3,4-dihydro-N,2-dimethyl - 6 - trifluoromethyl-1,2,4-benzothiadiazine-7-sulfonamide 1,1-dioxide).

7. 3,3'-ethylenebis-(3,4-dihydro - N,2 - diphenyl-6-trifluoromethyl-1,2,4-benzothiadiazine-7-sulfonamide 1,1-dioxide).

8. 3,3'-bis-[3,4-dihydro-trifluoromethyl - 3 - (lower alkyl)-1,2,4-benzothiadiazine-sulfonamide 1,1-dioxide].

9. 3,3'-bis-(3,4-dihydro-3-methyl - 6 - trifluoromethyl-1,2,4-benzothiadiazine-7-sulfonamide 1,1-dioxide).

10. 3,3'-p-phenylene-bis-(3,4 - dihydro-6-trifluoromethyl-1,2,4-benzothiadiazine-7-sulfonamide 1,1-dioxide).

References Cited in the file of this patent

UNITED STATES PATENTS

| | | |
|---|---|---|
| 2,809,194 | Novello | Oct. 8, 1957 |
| 2,894,948 | De Stevens | July 14, 1959 |

OTHER REFERENCES

Freeman et al.: J. Org. Chem., vol. 16, pages 818, 821, 835 (1951).

The Wall Street Journal, Nov. 5, 1958, page 19 (Washington, D.C. Ed.).

Herrmann et al.: Texas State of Medicine (December 1958), pages 854–8.

Holdrege et al.: Abstract of Papers, 135th Am. Chem. Soc. Meeting, Apr. 5–10, 1959, page 19 N.